United States Patent [19]

Wallaeys et al.

[11] Patent Number: 5,444,098

[45] Date of Patent: Aug. 22, 1995

[54] MAINLY CLOSED CELL PHENOLIC FOAM AND PROCESS FOR PRODUCING THIS FOAM

[75] Inventors: Bart Wallaeys, Wetteren; Peter Spanhove, Serskamp, both of Belgium

[73] Assignee: Recticel, Brussels, Belgium

[21] Appl. No.: 181,045

[22] Filed: Jan. 14, 1994

Related U.S. Application Data

[63] Continuation-in-part of Ser. No. 89,195, Jul. 12, 1993, abandoned.

[30] Foreign Application Priority Data

Jul. 13, 1992 [BE] Belgium .................... 09200648

[51] Int. Cl.$^6$ ............................................. C08J 9/00
[52] U.S. Cl. ........................................ 521/95; 521/128; 521/131; 521/181
[58] Field of Search .................. 521/131, 95, 128, 181

[56] References Cited

U.S. PATENT DOCUMENTS

| | | | |
|---|---|---|---|
| 5,162,384 | 11/1992 | Owens et al. | 521/131 |
| 5,210,106 | 5/1993 | Dams et al. | 521/131 |
| 5,211,873 | 5/1993 | Dams et al. | 521/131 |

Primary Examiner—Morton Foelak
Attorney, Agent, or Firm—Finnegan, Henderson, Farabow, Garrett & Dunner

[57] ABSTRACT

The invention relates to a process for producing a mainly closed cell phenolic foam by curing a foam system comprising at least a phenolic resin and a blowing agent. This curing is effected in the presence of an either or not alkylated morpholine which is fluorated whether completely or not and which corresponds to the following general structural formula:

$$C_nH_xF_yNO$$

wherein:
$N \geq 4$
$x = 2n + 1 - y$
$y = 2n + 1 - x$.

In this way, it is possible to obtain a phenolic foam having good insulation properties even if use is made of a blowing agent which is substantially free of CFC's or if the foam temperature is allowed to rise during the curing upto above 85° C. to obtain a better curing.

19 Claims, No Drawings

MAINLY CLOSED CELL PHENOLIC FOAM AND PROCESS FOR PRODUCING THIS FOAM

This is a continuation-in-part of U.S. Ser. No. 08/089,195, filed Jul. 12, 1993, now abandoned, incorporated herein by reference.

The present invention relates to a mainly closed cell phenolic foam comprising a cellular phenolic resin and having a closed cell content of at least 80% and to a process for producing such a closed cell phenolic foam.

In practice, such phenolic foams are mainly used as insulating material. For this application, it is important for the foam to have a sufficiently high closed cell content. As a matter of fact, a high content of closed cells is requires to obtain a foam having a low thermal conductivity coefficient and further to avoid moisture absorption by the foam.

European Patent Application No. 0 170 357 discloses a process for producing closed cell phenolic foam. According to this patent application, it is essential to control the temperature of the curing phenolic resin in such a manner that it does not rise up to above 85° C. In this way, the rupture of a too large number of cells during the curing, resulting amongst others in bad insulation properties is avoided. However, it will be clear that such a limitation of the temperature during the curing process does not permit an optimum control of this curing process.

An object of the present invention is therefore to provide a mainly closed cell phenolic foam of the hereinabove defined type, during the production of which the temperature of the curing phenolic foam system may rise up to higher values without resulting in the rupture of a too large number of cells.

To this end, the closed cell phenolic foam of the present invention comprises an either or not alkylated morpholine which is fluorated whether completely or not, and which corresponds to the following general structural formula:

$$C_nH_xF_yNO$$

wherein :
$n \geq 4$ $$x = 2n+1-y$$

$$y = 2n+1-x.$$

More in particular, the phenolic foam comprises preferably perfluoro-N-methyl morpholine.

According to the present invention it was found that the presence of the above-identified morpholine permits the closed cell phenolic foam, having a closed cell content of at least 80%, to be prepared at higher temperatures. In this respect, the present invention also relates to a process for producing a mainly closed cell phenolic foam by curing a foam system, comprising at least a phenolic resin and a blowing agent, in the presence of an either or not alkylated morpholine which is fluorated whether completely or not, and which corresponds to the following general structural formula :

$$C_nH_xF_yNO$$

wherein :
$n \geq 4$ $$x = 2n+1-y$$

$$y = 2n+1-x,$$

wherein during said curing the internal foam temperature being allowed to rise during the curing up to a temperature higher than 85° C.

The application of such higher temperatures in combination with the use of a hereabove defined morpholine, such as perfluoro-N-methylmorpholine, permits to produce phenolic foams which have the same open cell content and also a same thermal conductivity coefficient as phenolic foams prepared at lower temperatures but which are, on the other hand, better cured. It has been observed that, due to this better curing, a foam is obtained which is less friable and which has moreover still a good rigidity. Both the rigidity and the friability are important properties of the phenolic foam which is used for example as floor insulation or for example also in the shape of semi-cylindrical scales which can be snapped into one another around a duct which is to be insulated.

A further advantage of higher temperatures during the curing is the higher curing speed and therefore also the shorter production process.

As to the use of perfluoro-N-methyl morpholine, U.S. Pat. No. 5,210,106 discloses the use of such a morpholine in a process for preparing a foamed plastic in order to obtain a closed cellular foam having a low thermal conductivity. All of the examples and nearly the entire description of this patent relate, however, to the production of polyurethane foams, only one paragraph of this patent indicating the possibility of using this morpholine also in phenolic homopolymers.

The present inventors have found, however, that by applying the teachings of U.S. Pat. No. 5,210,106 no closed cell phenolic foam can be prepared. More particularly they found that this is due to the use of a fluorochemical surfactant, which is clearly indicated in U.S. Pat. No. 5,210,106 as an essential component for the process according to this patent.

In this respect, the present invention further relates to a process for producing a mainly closed cell phenolic foam by curing a foam system, comprising at least a phenolic resin, a blowing agent and a foam stabilizer, said curing being effected in the presence of morpholine, an alkylated morpholine, a fluorated morpholine or a fluorated, alkylated morpholine, and which corresponds to the following general structural formula :

$$C_nH_xF_yNO$$

wherein :
$n \geq 4$ $$x = 2n+1-y$$

$$y = 2n+1-x$$

In a particular embodiment of the invention, said blowing agent comprises up to 50% by weight at the most, and preferably up to 5% by weight at the most of completely halogenated chlorofluorohydrocarbons.

In a preferred embodiment of the invention, said blowing agent is substantially free of completely halogenated chlorofluorohydrocarbons. In that case, it comprises preferably a physical blowing agent from the group of the hydrogenated chlororfluorohydrocarbons such as HCFC 141b, HCFC 123, HCFC 22, HCFC 142b and HCFC 134a, the incompletely halogenated hydrocarbons such as 2-chloropropane or the hydrocarbons such as isopentane, n-pentane, cyclopentane and hexane, or a combination of these physical blowing agents.

Generally it is believed that blowing agents consisting of completely halogenated hydrocarbons (CFC's) have a damaging effect on the protective ozone layer above the earth. However, these CFC's have ideal properties for obtaining fine cellular phenolic foams with a good insulation coefficient. Now it was found that also other physical blowing agents, such as for example the partially hydrogenated chlorofluorohydrocarbons (HCFC's) permit to obtain analogous results when used in combination with a morpholine as defined hereinabove and in particular with perfluoro-N-methylmorpholine. Indeed, the use of such a morpholine results in obtaining a finer cellular structure. This has been observed in particular clearly for perfluoro-N-methylmorpholine.

Further particularities and advantages of the invention will become apparent from the following description of some embodiments of a process for producing a mainly closed cell phenolic foam according to the invention. This description is only given by way of example and does not limit the scope of the invention.

The invention in general relates to a process for producing a mainly closed cell phenolic foam by curing a foam system comprising at least a phenolic resin and a blowing agent. In particular, there is obtained a phenolic foam having at least 80% closed cells and preferably even at least 90% closed cells.

By the expression "foam system", there is meant here a previously prepared phenolic resin which can still react further by addition of heat and/or of a catalyst and to which there is added at least a blowing agent so that a mixture or more particularly an emulsion is obtained which foams during the further reaction of the phenolic resin. This foaming is caused by the blowing agent which expands due to the supplied heat but especially also due to the heat released during the further exothermic reaction of the phenolic resin.

The phenolic resin is produced by condensation of an either or not substituted phenol and/or phenol derivative and an aldehyde. The molecular ratio between the aldehyde and the phenol is smaller than 4. The phenolic resin may be either of the resol or of the novolac type.

As phenol derivatives, use can be made of phenol alkylated or aryl substituted phenol compounds having as general structural formula :

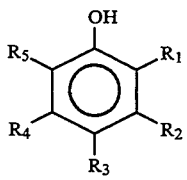

wherein $R_1$ to $R_5$ represent hydrogen atoms, alkyl groups, aryl groups, hydroxyl groups or a combination thereof. Important examples hereof are phenol, cresols, xylenols, ortho-, meta- or para substituted higher phenols, resorcinol, cathechol; hydroxyquinone; $\beta$-phenylalkyl substituted phenols, etc . . . Also polynuclear phenol derivatives, such as for example bisphenols or tri- or tetranuclear phenol compounds are appropriate for preparing the concerned phenolic foams. Further use can be made of combinations of all of these compounds.

As aldehydes, use can also be made, in addition to the most conventional formaldehyde, of higher homologues such as glyoxal, acetaldehyde, benzaldehyde, furfural, choral, etc . . . Also substances which are able to release aldehydes under the reaction circumstances may be appropriate (for example paraformaldehyde).

For the production of resol resins, the condensation between the phenol (derivative) and the aldehyde is effected under alkaline conditions. Use is made hereto as catalysts of hydroxides, carbonates or organic amines. Preferably, use is made of less than 5% by weight of catalyst in the total reaction mixture.

The condensation is effected most commonly at temperatures between 60° C. and 150° C. and is interrupted in a time which comprises usually less than 8 hours. In the production process of the resol resins, water is usually added serving often as a solvent for the aldehyde. The technology for producing these resol resins may be of the conventional type wherein, after the development of the condensation, the reaction is slowed down by a gradual decrease of the temperature and is stopped completely by neutralization of the alkaline catalyst. The technology may also be of the "ion exchange" type. In this case, use is made of various ion exchange resins for making the phenolic resin substantially free of ions. Such resins show after the production often also a higher stability than the resins of the hereabove described conventional type.

For the production of novolacs it is known that the aldehyde/phenol (derivative) ratio is smaller than 1. Preferably this ratio is situated between 0.3 and 1. The condensation occurs most usually under acid or neutral conditions. Use is made hereto either of strong acids, such as for example sulfuric acid and hydrochloric acid, or of weaker acids, such as for example oxalic acid or phosphoric acid. The novolacs may also be synthesised by means of specific metal catalysts such as for example Zn(acetate)$_2$.

In contrast to the resols, an aldehyde donor has always to be added, as it is already known, for the curing of novolacs such as for example an active resol resin or substances such as for example hexamethylenetetramine, paraformaldehyde, trioxane, dioxolane, etc . . . Preferably, use is made of a concentration of between 1 and 30 parts by weight of aldehyde-donor with respect to 100 parts by weight of novolac.

After the synthesis of the resol or novolac resin, the excess water is removed and the final product is subsequently separated off and can possibly be further converted to for example a resol, respectively novolac solution, derivative, etc . . . .

For the production of the phenolic foam, a physical blowing agent is added to the so-obtained condensation product of phenol or phenol derivative and aldehyde. This blowing agent is more particularly emulsified into the viscous mass of the phenolic resin.

As blowing agent, use can be made of the known completely halogenated chlorofluorohydrocarbons (CFC's). Due to the negative effects of such hydrocarbons onto the ozone layer, a physical blowing agent is used in a preferred embodiment comprising upto 50% at the most of these CFC's and preferably only upto 5% CFC's. Ideally, a blowing agent is used which is substantially free of CFC's.

Particularly suited blowing agents different from the CFC'S are the hydrogenated chlorofluorohydrocarbons such as HCFC 141b, HCFC 123, HCFC 22, HCFC 142b and HCFC 134a. Other possible blowing agents are alkanes (halogenated alkanes in pure form and/or as a mixture), or further products which release gasses such as $N_2$ or $CO_2$ by thermal degradation, such as for example the azo-compounds, the N-nitroso-compounds, the sulfonyl hydrazides..., or products which release gasses by chemical decomposition, such as for example the alkaline earth and alkaline carbonates under influence of an acid medium. The amount of blowing agent used in the formulation depends on the density to be obtained. Use is usually made of 0–50 parts by weight of blowing agent per 100 parts by weight of resin.

In order to be able to obtain a same type of cellular structure with these alternative blowing agents as with the conventional CFC's, the curing and therefore the foaming of the phenolic resin is effected in the process according to the invention in the presence of morpholine, an alkylated morpholine, a fluorated morpholine or a fluorated, alkylated morpholine to the following general structural formula :

$C_nH_xF_yNO$ wherein : $n \geq 4$ $x = 2n + 1 - y$ $y = 2n + 1 - x$

As it will become apparent hereinafter, such a morpholine permits also in this way to improve the general physical properties of the phenolic foam. In particular, a more flexible foam can be obtained. Amongst the hereabove indicated morpholines, preference is given to perfluoro-N-methylmorpholine.

An important advantage of the use of such a morpholine consists in that the temperature in the foaming resin may rise higher without resulting in the rupture of a too large amount of cells, especially in the middle of the foam where the temperature reaches the highest value due to the exothermic reaction. For the production of foam blocks, the highest temperature is obtained in average some hours after the start of the curing process.

In an effective embodiment of the process according to the invention, the internal foam temperature is allowed to rise upto above 85° C., and preferably upto a temperature situated between 87° and 130° C. A particular preference is given to allowing the temperature to rise upto 88° to 95° C. In this way, it is possible to produce a rigid but less friable phenolic foam compared to foams wherein the foam temperature was kept below 85° C.

Since it is already known to control the foam temperature, this will not be discussed here very thoroughly. In particular for block foam, it can be argued in general that the maximum internal temperature which will be reached is mainly dependent on the exothermicity of the foaming phenolic resin and less of the ambient or furnace temperature in view of the insulation properties of the phenolic foam. The furnace temperature is mainly adjusted for rendering the temperature gradient in the foam block as small as possible. For laminate foam, on the contrary, the internal foam temperature can be better controlled by adjusting the ambient or furnace temperature. Indeed, such foams have only a limited thickness.

In order to obtain the hereabove described effects onto the cell structure and onto the rupture of the cells, an amount of 0.01 to 10 parts by weight of the morpholine and in particular of the perfluoro-N-methylmorpholine per 100 parts by weight of resin appeared to be effective. Preferably, use is made of about 0.05 to 5 parts by weight of the morpholine per 100 parts by weight of resin. It is clear that these parts by weight of resin relate to the entire resin, thus comprising also the amount of the solvent present in the used resin.

In most cases, a catalyst is required for the curing of the foam system. However, in those cases wherein a particularly active phenolic resin with thermo-curing properties is used, the supply of energy, such as for example in the form of a temperature increase, may cause sufficient catalytic effect so that the addition of a catalyst becomes facultative. Moreover, depending on the resin type base, a catalyzed curing of the resin can be effected.

As catalyst use can be made of an inorganic acid, such as sulphuric acid, phosphoric acid, etc... or a mixture thereof, or of an organic strong acid such as for example the arylsulphonic acids of the general type :

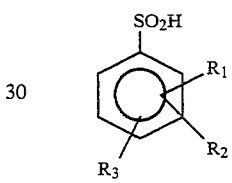

wherein $R_1$, $R_2$ and $R_3$ represent an alkyl group, halogen, amine, $SO_3H$, aryl group of a combination thereof. Other useful arylsulphonic acids are the products, such as for example the substituted naphthalene sulphonic acids. Preferably, use is made of the pure forms, or of mixtures of these compounds. As indicated in U.S. Pat. No. 4,478,958, the determining factor for the usefulness is not the kind of the acid but the acidity constant and the compatibility of the acid with the resin and with the solvents in the resin. As known, the phenolic resins can also be cured in an alkaline medium.

The amount of catalyst comprises 0.5 to 40 parts by weight per 100 parts by weight of resin. This amount is usually smaller than 25 parts by weight.

The foam system according to the invention comprises, in addition to the phenolic resin, the blowing agent and usually the catalyst, preferably further a tensio-active compound as emulsion and foam stabilizer. This tensio-active compound may be of the organic type, such as for example the condensation products of alkylene oxides (such as for example ethylene oxide en propylene oxide or a combination thereof) with alkylphenols (such as for example nonylphenol, dodecylphenol, etc... ). Also the ethoxylated products of esterified oil are examples of known foam stabilizers (see U.S. Pat. No. 3,779,959). Other types of tensio-active compounds, such as for example siloxane-oxyalkylene copolymers, which comprise essentially Si-O-C and/or Si-C links, may also be used to this end.

Further, a number of additives can be added to control the physical properties of the final product. Amongst these components, the following compounds can be classified :

urea and/or resorcinol or derivatives thereof for masking the releasing amounts of aldehyde. The amounts which are used in this respect are situated between 0 and 15 parts by weight per 100 parts by weight resin. More specifically, amounts are used of between 1 and 5 parts by weight;

plasticizers, such as for example dimethylterephtalate, dimethylphthalate, polymeric phthalic acid esters, sulphone amides, etc . . . De used amounts are usually smaller than 25 parts by weight pet 100 parts by weight resin;

other additives, such as fillers, dyes, etc . . . may be applied in this invention. The amounts used thereof may amount to 50 parts by weight per 100 parts by weight resin, and this depending on the nature of the additive.

A further additive proposed by the invention is potassium acetate, more particularly in an amount of upto 2 parts by weight at the most per 100 parts by weight phenolic resin. It was found that this potassium acetate can be used in the foam system for pushing back the possible occurrence of air holes in the phenolic foam.

In a particular embodiment of the process according to the invention, the phenolic foam is produced by mixing the resin, the catalyst, the blowing agent, the foam stabilizer and possibly other additives with one another, whereby the foam system expands substantially immediately under atmospheric pressure.

For giving the foam the desired shape, the reacting mixture can be applied in closed mould in a such an amount that, due to the expansion of the foam, the foam fills the entire mould and a pressure is built up. This pressure may rise in certain circumstances upto more than 1000 kPa. For the production of low density foams, the built-up pressure remains usually below 80 kPa. Partly due to the exothermicity of the reaction and the increased temperature of the mould, a rigid foam plate is formed.

Another possibility for processing the phenolic resins is the continuous method. The components are mixed hereto under pressure in a mixing chamber. The mixture is applied either through an arm moving to and fro, or through a special distribution system, consisting for example of a number of mixing heads which are installed next to one another, or through any other system whereby the material can be distributed homogeneously. The reacting foam is applied onto a bottom covering, which may be of any kind, and which is put in motion onto a bottom conveyor belt.

The expanding foam is brought into contact with an upper covering which is moved through an upper conveyor belt. The distance between the conveyor belts determines the thickness of the produced plates. Further expansion of the foam is limited through so-called pressure plates, so that a pressure arises which is usually higher than 10 kPa and which comprises preferably about 40 kPa. The increased temperature at the conveyor belts, which are heated upto a temperature of 60° to 70° C., provides for a faster curing of the foam. The foams produced in this way have a density which is usually situated between 20 and 80 kg/m$^3$.

The phenolic foams can also be produced in blocks, whereto the expanding mixture is introduced into an open mould and cures further under atmospheric conditions.

Another way for producing phenolic foam is an "in situ" foam formation. To this end, the reacting mixture is applied with an appropriate distribution system onto the surfaces to be treated.

Another possibility consists in injecting the expanding foam between two fixed plates, such as for example steel plates, which are mounted in a press so that the entire expansion of the foam is limited. A typical application for such produced sandwich panels consists in the use as construction material.

The phenolic foams may be provided either or not with a covering. The most usual coverings are of the type :

non-woven glass fibres with organic binder such as urea/formaldehyde, melamine/formaldehyde, polyvinyl alcohol, etc . . .

glass fleece with mineral coating, bitumen, etc. . .

glass fleece in combination with Al laminates rigid coverings, such as for example gypsum boards, wood, percite, etc . . .

metal foil.

In the following examples, the process according to the invention and in particular the effects of the use of perfluoro-N-methylmorpholine will be illustrated more into details.

The properties indicated in these examples were established according to the following measuring methods :

| | |
|---|---|
| friability (%) | ASTM C421 |
| closed cells (%) | ASTM D2856, part C |
| λ-value (W/mK) | ISO 2581 |
| rigidity (kPa) | DIN 53 421 |

EXAMPLES 1-5

In these examples, a phenolic resin was first prepared in a known way having the characteristics as shown in Table 1 and this starting from phenol and formaldehyde.

TABLE 1

| Characteristics of the phenolic resin | |
|---|---|
| formaldehyde/phenol ratio | 1.4/1 |
| % water | 15.6 |
| % free phenol | 7.6 |
| % free formaldehyde | 0.4 |
| pH | 5.2 |

The used foam formulations are represented in Table 2

TABLE 2

| | Foam formulations of examples 1-5 | | | | |
|---|---|---|---|---|---|
| Example | 1 | 2 | 3 | 4 | 5 |
| Resin | 100 | 100 | 100 | 100 | 100 |
| Surfactant G 1284* | 4 | 4 | 4 | 4 | 4 |
| Dimethylphthalate | 5 | 5 | 5 | 5 | 5 |
| HCFC 141b | 12 | 12 | 12 | 12 | 12 |
| Perfluoro-N-methyl morpholine | 0 | 0.05 | 0.3 | 1 | 0.3 |
| Catalyst [65% H$_2$SO$_4$][85% H$_3$PO$_4$] 75/25 | 15 | 15 | 15 | 15 | 13 |

*trademark of ICI (= Castor oil derivative + 40 EO).

The foams were produced in blocks of 1×1×3 m in an open metal mould which was placed in a furnace on a temperature of 60° C. In these examples, the process, more particularly the addition of foam stabilizer, was controlled in such a manner that no fluorochemical surfactants were added to the foam formulations. The obtained characteristics are summarized in Table 3.

TABLE 3

| Characteristics of the foams from Examples 1–5 | | | | | |
|---|---|---|---|---|---|
| | 1 | 2 | 3 | 4 | 5 |
| Density (kg/m³) | 32.4 | 33 | 32.9 | 34 | 36 |
| Max.exotherm (°C.) | 101 | 99 | 100 | 98 | 92 |
| Friability (%) | 33.4 | 27 | 25 | 25 | 26 |
| Closed cells (%) | 79 | 85 | 92 | 91 | 91 |
| λ-value (W/mK) | 0.0321 | 0.0210 | 0.0185 | 0.0187 | 0.0184 |

It is clear that example 1 is not according to the invention but has been given only as comparative example.

Examples 1–5 demonstrate clearly the effect of perfluoro-N-methylmorpholine : the high temperatures obtained in the curing foam after about 5 to 6 hours result in partially open cell material (example 1). The addition of small amounts of perfluoro-N-methylmorpholine causes an unexpected improvement of the percentage closed cells, γ-value and friability. This shows that the high exotherm which provides for an excellent curing of the foam, does no=have any disadvantageous effect on the closed cellular nature of the system.

EXAMPLES 6–9

In these examples a phenolic resin was first prepared in a known way having the characteristics as shown in Table 4 and this also starting from phenol and formaldehyde.

TABLE 4

| Characteristics of the resin employed in examples 6–9. | |
|---|---|
| Formaldehyde/phenol ratio | 1.5/1 |
| % water | 16% |
| % free phenol | 6.8 |
| % free formaldehyde | 0.25 |
| pH | 5.0 |

The employed formulations are shown in Table 5.

TABLE 5

| Foam formulations of examples 6–9 | | | | |
|---|---|---|---|---|
| Examples | 6 | 7 | 8 | 9 |
| Resin | 100 | 100 | 100 | 100 |
| Surfactant G 1284* | 4.5 | 4.5 | 4.5 | 4.5 |
| Dimethylphthalate | 5 | 5 | 5 | 5 |
| HCFC 141b | 11 | — | — | — |
| HCFC 123 | — | 13 | — | — |
| 2-chloropropane | — | — | 8 | — |
| pentane | — | — | — | 8 |
| perfluoro-N-methylmorpholine | 0.9 | 0.9 | 0.9 | 0.9 |
| [50% H₂SO₄][85% H₃PO₄] (80/20) | 17 | 17 | 17 | 17 |

The foams were produced in the same way as in examples 1–5 in blocks of 1×1×3 m, the process being also controlled in such a manner that no fluorochemical surfactants were added to the foam formulations.

The obtained results are summarized in Table 6.

TABLE 6

| Properties of the foams from examples 6–9 | | | | |
|---|---|---|---|---|
| Example | 6 | 7 | 8 | 9 |
| Density (kg/m³) | 45 | 47.2 | 46.3 | 44.2 |
| Max.exotherm (°C.) | 89 | 91 | 89 | 92 |
| Friability (%) | 10 | 15 | 16 | 10 |
| Closed cells (%) | 93.4 | 91.3 | 92.7 | 89.2 |
| λ-value (W/mK) | 0.0171 | 0.0182 | 0.0187 | 0.0205 |
| Rigidity (kPa) | 247 | 238 | 225 | 254 |

As it appears from these examples, perfluoro-N-methylmorpholine allows to cure the material at temperatures situated between 88° and 95° C. without obtaining bad γ-values. The low friability and the high rigidity of the material are the results of this good curing.

The fact that in these examples 6–9 the temperature rose less high than in examples 1–5 is due to the lower reactivity of the phenolic resin.

EXAMPLES 10–11

In these examples, a phenolic resin was first prepared in a known way having the characteristics as represented in Table 7 and this also starting from phenol and formaldehyde.

TABLE 7

| Properties of the foam employed in examples 10–11 | |
|---|---|
| Formaldehyde/phenol ratio | 2/1 |
| % water | 15.5 |
| % free phenol | 2.9 |
| % free formaldehyde | 3.1 |
| pH | 5 |

The resin such as described in Table 7 was employed for foaming according to the double-belt process between conveyor belts heated to a temperature of about 65° C. The produced foams had a thickness of 7 cm.

The used foam formulations and the obtained properties are shown in Table 8. All of these foam formulations were verified to have a content of fluorochemical surfactants lower than the upper limits given hereinabove, More particularly care was taken that these foams formulations were free of fluorochemical surfactants.

TABLE 8

| Foam formulations and properties | | |
|---|---|---|
| Example | 10 | 11 |
| Resin | 100 | 100 |
| Urea | 4.7 | 4.7 |
| HCFC 141b | 10 | — |
| 2-chloropropane | — | 8 |
| Perfluoro-N-methylmorpholine | 1 | 1 |
| xylene/toluene sulphonic acid | 22 | 22 |
| Density (Kg/m³) | 42.3 | 42.6 |
| Friability (%) | 24 | 22 |
| Closed cells (%) | 92.3 | 93.7 |
| λ-value (W/mK) | 0.0174 | 0.0186 |
| Rigidity (kPa) | 152 | 165 |

This Table shows that a high closed cell content and a good insulation value are obtained. Further it has been observed that a fine cellular foam structure was obtained which was due amongst others to the presence of perfluoro-N-methylmorpholine in the foam formulations.

COMPARATIVE EXAMPLES 12 TO 22

In order to demonstrate the effect of fluorochemical surfactants on the foam quality, example 6 was repeated but instead of using a fluorochemical surfactant free foam stabilizer, 1 part by weight of the fluorochemical surfactants (Trademarks of 3M) indicated in Table 9 were respectively added per 100 parts by weight of resin to the foam formulation of example 6. The γ-value of the obtained phenolic foams are also indicated in Table 9.

TABLE 9

Foam formulations and properties of examples 12-22

| Example | Fluorochemical surfactant | λ-value (W/mk) |
|---|---|---|
| 12 | Fluorad FC-93 | Coarse cellular foam & foam collapses |
| 13 | Fluorad FC-95 | Coarse cellular foam & foam collapses |
| 14 | Fluorad FC-98 | Coarse cellular foam & foam collapses |
| 15 | Fluorad FC-100 | Coarse cellular foam & foam collapses |
| 16 | Fluorad FC-129 | coarse cellular foam & foam collapses |
| 17 | Fluorad FC-135 | Coarse cellular foam & foam collapses |
| 18 | Fluorad FC-170 | Coarse cellular foam & foam collapses |
| 19 | Fluorad FC-750 | Coarse cellular foam |
| 20 | Fluorad FC-751 | Coarse cellular foam |

These examples 12 to 20 show clearly the adverse effects of the presence of 1 part by weight of a fluorochemical surfactant on the closed cell content and on the foam formation.

From the previous description it will be clear that the invention is not limited to the hereabove described embodiments but that all kind of modifications can be applied thereto without leaving the scope of the present invention.

What is claimed is:

1. A process for producing a mainly closed cell phenolic foam having a closed cell content of at least 80% by curing a foam system, comprising at least a phenolic resin, a blowing agent and a foam stabilizer substantially free of fluorochemical surfactant said curing being effected in the presence of morpholine, an alkylated morpholine, a fluorated morpholine, or a fluorated, alkylated morpholine and which corresponds to the following general structural formula:

$$C_nH_xF_yNO$$

wherein: $n > 4$ $x = 2n + 1 - y$ $y = 2n + 1 - x$

2. The process of claim 1, wherein said curing is effected in the presence of perfluoro-N-methylmorpholine.

3. The process of claim 1, wherein said foam system comprises a catalyst.

4. The process of claim 1, wherein said morpholine is perfluoro-N-methylmorpholine, present in an amount of 0.01 to 10 parts by weight per 100 parts by weight of phenolic resin.

5. The process of claim 1, wherein said blowing agent is a completely halogenated chlorofluorohydrocarbon and is present in an amount up to 50% by weight.

6. The process of claim 5, wherein said blowing agent is substantially free of said completely halogenated chlorofluorohydrocarbon.

7. The process of claim 1, wherein said blowing agent is selected from the group consisting of a hydrogenated chlorofluorohydrocarbon, a partially halogenated hydrocarbon, a hydrocarbon, or mixtures thereof.

8. The process of claim 1, wherein the internal foam temperature is allowed to rise during the curing up to a temperature higher than 85° C.

9. The process of claim 1, wherein the foam system comprises potassium acetate in an amount up to 2 parts by weight per 100 parts by weight of phenolic resin.

10. The process of claim 1, wherein the foam system contains a plasticizer.

11. The process of claim 10, wherein said foam system contains dimethylphthalate as plasticizer.

12. The process of claim 4, wherein the perfluoro-N-methylmorpholine is present in an amount of 0.5 to 5 parts by weight per 100 parts by weight of phenolic resin.

13. The process of claim 5, wherein said blowing agent is present in an amount of up to 5% by weight.

14. The process of claim 7, wherein said hydrogenated chlorofluorohydrocarbon is HCFC 141b, HCFC 123, HCFC 22, HCFC 142b, or HCFC 134a.

15. The process of claim 7, wherein the partially halogenated hydrocarbon is 2-chloropropane.

16. The process of claim 7, wherein the hydrocarbon is isopentane, n-pentane, cyclopentane, or hexane.

17. The process of claim 7, wherein the internal foam temperature is allowed to rise between 87° and 130° C.

18. The process of claim 7, wherein the internal foam temperature is allowed to rise between 88° and 95° C.

19. The process of claim 10, wherein the plasticizer is dimethylterephthalate, dimethylphthalate, polymeric phthalic acid esters, or sulphone amides.

* * * * *

UNITED STATES PATENT AND TRADEMARK OFFICE
CERTIFICATE OF CORRECTION

PATENT NO. : 5,444,098
DATED : August 22, 1995
INVENTOR(S) : Bart Wallaeys et al.

It is certified that error appears in the above-indentified patent and that said Letters Patent is hereby corrected as shown below:

ABSTRACT, line 10, "$N \geq 4$" should read --$n \geq 4$--;

Claim 1, column 11, line 37, after "surfactant" insert --,--;

and column 11, line 45, "$n > 4$" should read --$n \geq 4$--.

Signed and Sealed this

Twenty-seventh Day of February, 1996

Attest:

BRUCE LEHMAN

*Attesting Officer*   *Commissioner of Patents and Trademarks*